Oct. 17, 1972   P. H. ARBESMAN ET AL   3,698,960

SOLID BATTERY ELECTROLYTE AND METHOD OF PREPARATION THEREOF

Filed June 21, 1971

INVENTORS
Paul H. Arbesman
Stanley D. James
Donald L. Warburton

BY

ATTORNEY
AGENT

3,698,960
SOLID BATTERY ELECTROLYTE AND METHOD OF PREPARATION THEREOF

Paul H. Arbesman, Danbury, Conn., and Stanley D. James, Bethesda, and Donald L. Warburton, Fulton, Md., assignors to the United States of America as represented by the Secretary of the Navy
Filed June 21, 1971, Ser. No. 155,088
Int. Cl. H01m *11/00*
U.S. Cl. 136—153                                6 Claims

ABSTRACT OF THE DISCLOSURE

A solid battery electrolyte of the formula $MAg_4X_5$ wherein M represents K, Rb, $NH_4$, Co or mixtures thereof provided that Cs is present only as a minor constituent of M, and X represents halogen is prepared by simultaneously subjecting the corresponding dry powders of $MAg_4X_5$ to heat and pressure. The solid electrolytes thus obtained have very low porosity.

BACKGROUND OF THE INVENTION

This invention generally relates to solid battery electrolytes and more particularly to solid battery electrolytes of the formula $MAg_4X_5$ which have very low porosity.

Prior art methods of compacting dry powders into pellet form are well known. This usually involves putting a preweighed amount of powder into a pellet die and pressing it at some pressure so that the materials flow together to give a pellet of the desired mechanical strength.

In the solid electrolytes used in solid electrolytes batteries such as described in U.S. Pat. 3,443,997, by Gary R. Argue and Boone B. Owens issued May 13, 1969 and hereby incorporated by reference, another property, reduced porosity, is needed besides mechanical strength. In the typical solid electrolyte battery a solid electrolyte is sandwiched between an anode and a cathode, and the danger exists that gases from either the anode or the cathode will migrate through the solid electrolyte and tend to discharge the battery before use. In order to maintain the battery at maximum capacity, thereby improving its shelf-life, it is desirable not only to decrease the porosity of the solid electrolyte but to do so in such a manner as to not adversely affect the performance of the battery. Thus research has attempted to find an easy, reliable method for decreasing the porosity of such solid electrolytes without adversely affecting the overall performance of the battery.

SUMMARY OF THE INVENTION

Accordingly, one object of this invention is to provide a solid electrolyte which has relatively low porosity.

Another object of this invention is to provide a solid electrolyte which will minimize gaseous diffusion between the anode and cathode of solid electrolyte batteries.

A still further object of this invention is to provide a method for the preparation of relatively non-porous solid electrolytes.

Yet another object of this invention is to provide a relatively easy and reliable method for the preparation of relatively non-porous solid electrolytes.

These and other objects of this invention are accomplished by providing a process for the production of said relatively non-porous solid electrolytes with comprises simultaneously pressing and annealing dry powders of the formula $MAg_4X_5$, wherein M is K, Rb, $NH_4$, Cs or mixtures thereof, provided that Cs is present only as a minor constituent of M and X is halogen, at a temperature not above the melting point of said powders and at a pressure between 35,000 and 70,000 p.s.i.

BRIEF DESCRIPTION OF THE DRAWINGS

Still other objects and many of the attendant advantages of the present invention will be readily appreciated as the same becomes better understood by reference to the following detailed description when considered in connection with the accompanying drawings wherein.

DESCRIPTION OF THE PREFERRED EMBODIMENTS

Figure 1:
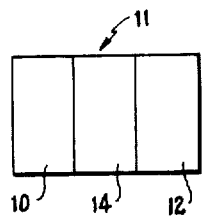
FIG. 1 is a schematic representation of a typical solid electrolyte battery.

Referring now in greater detail to the drawings and particularly to FIG. 1 thereof a solid electrolyte 14 of a solid state battery 11 is interposed between a cathode 10 and an anode 12. The solid electrolyte is prepared in the pellet pressing apparatus shown in FIG. 2 wherein a three piece die comprising a punch 16, a sleeve 18 and a base 20 is used to press the metal powder 14 into a solid pellet. The powder is heated by a pair of heated press platens 22 and 24 which also supplies the pressure from a force applying means; not shown, to push punch 16 through sleeve 18 to form the pellet. A jacket of insulating material 26 surrounds the die to minimize heat loss. A thermocouple 30 is used to monitor the temperature within the die.

The general nature of the invention having been set forth, the following example is presented as specific illustrations thereof. It will be understood that the invention is not limited to this specific example but is susceptible to various modifications that will be recognized by one of ordinary skill in the art.

EXAMPLE

Figure 2:
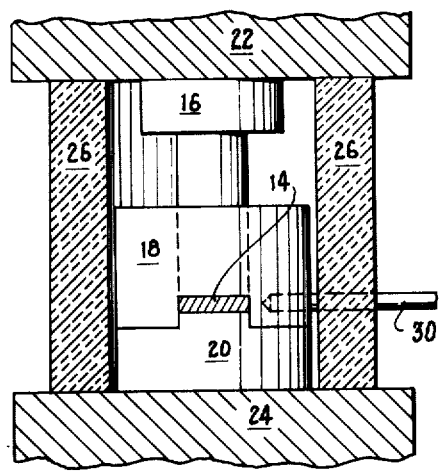
FIG. 2 is a side elevation, partially in section, of an apparatus which may be used to carry out the process of this invention.

A preweighed sample of $RbAg_4I_5$ powder was placed in the pellet die and was subjected to a pressure of about 55,000 p.s.i. At the same time the temperature around the sample being pelletized was maintained at about 120° C. by use of heated platens and insulating jacket as shown in FIG. 2. These conditions were maintained from 2 to 16 hours and it was found that these conditions caused the electrolyte to flow i.e., caused its crystal structure to rearrange. This resulted in the growth of larger crystals which reduced the number of grain boundaries within the pellet and also reduced the porosity. These pellets showed a threefold decrease in diffusion rate over pellets produced by the standard dry powder compaction method.

Similarly powders of the other materials of the formula $MAg_4X_5$ which are treated in a similar manner yield a solid electrolyte which has decreased porosity. The temperature used may vary from about 100° C. up to, but not including, the melting point of the material being pelletized but as can readily be understood when the lower temperatures are used little rearrangement will result.

Similarly the pressure may vary from about 35,000 p.s.i. to about 70,000 p.s.i.

The time factor is not critical but as will be realized by those skilled in the art, little rearrangement of crystal structure will occur if pressure and temperature are maintained for short periods of time. It has been found that porosity will be significantly reduced when pressure and temperature are maintained within the specified limits for a period of from 2–16 hours.

Furthermore it has been found that despite the change in crystal structure that is associated with the decrease in porosity, the ionic conductivity of the solid electrolyte is maintained and there is no adverse effect on the conductivity of the electrolyte.

Obviously numerous modifications and variations of the present invention are possible in light of the above teachings. It is therefore to be understood that within the scope of the appended claims the invention may be practiced otherwise than as specifically described herein.

What is claimed is:

1. A method of preparing a relatively low porosity solid electrolyte comprising simultaneously subjecting a powder of the formula $MAg_4X_5$, wherein M is selected from the group consisting of K, Rb, $NH_4$, Cs and mixtures thereof, provided that Cs is present only as a minor constituent of M, and X is halogen, to a pressure between about 35,000 p.s.i. and about 70,000 p.s.i. and a temperature between about 100° C. and below the melting point of the powder.

2. The method of claim 1 wherein said pressure is about 55,000 p.s.i.

3. The method of claim 1 wherein said powder is subjected to said pressure and temperature for 2–16 hours.

4. The process of claim 3 wherein M is Rb and X is I.

5. The process of claim 4 wherein said temperature is about 120° C. and said pressure is about 55,000 p.s.i.

6. The product of the process of claim 1.

References Cited

UNITED STATES PATENTS

| | | | |
|---|---|---|---|
| 2,689,876 | 9/1954 | Lehovec | 136—153 |
| 2,894,053 | 7/1959 | Louzos | 136—153 |
| 3,443,997 | 5/1969 | Argue et al. | 136—153 |
| 3,519,404 | 7/1970 | Argue et al. | 136—153 |

DONALD L. WALTON, Primary Examiner